United States Patent [19]
Dobbs

[11] 3,944,159
[45] Mar. 16, 1976

[54] COMBINATION FLY AND SPINNING REEL

[76] Inventor: Donald G. Dobbs, 4011 NW. 189 Terrace, Miami, Fla. 33055

[22] Filed: Aug. 23, 1974

[21] Appl. No.: 499,828

[52] U.S. Cl. .......................................... 242/84.2 B
[51] Int. Cl.² ........................................... A01K 89/00
[58] Field of Search .................. 242/84.2 B, 84.2 R

[56] References Cited
UNITED STATES PATENTS

| | | | |
|---|---|---|---|
| 2,612,325 | 9/1952 | Johnson | 242/84.2 B |
| 3,053,469 | 9/1962 | King | 242/84.2 B |

Primary Examiner—Edward J. McCarthy
Attorney, Agent, or Firm—Ernest H. Schmidt

[57] ABSTRACT

A combination fly and spinning reel tackle having an open-ended spinning type reel spool without bail retrieval mechanism and moveable between in line with rod position for casting, and transverse to rod position for retrieval, thereby combining the best features of spinning and fly reel gear in a single reel. The line spool is fixed with respect to a support lever so positioned and pivoted with respect to a base support member adapted for attachment to a fishing rod reel seat that tensional force upon the line in playing or retrieving a fish will have a tendency to maintain the reel in its selected position.

1 Claim, 3 Drawing Figures

COMBINATION FLY AND SPINNING REEL

This invention relates to sport fishing and is directed particularly to improvements in fishing reel gear.

In both salt water and fresh water sport fishing two kinds of fishing reels are commonly in use, one being the so-called fly or bait casting reel having a spool which extends transverse to the fishing rod and upon which the fishing line is wound for casting and retrieving as controlled by a winding lever and brake mechanism geared to the reel spool, and the other being the spinning reel wherein the spool is open-ended and in axial alignment with the fishing rod to permit spin-off during casting, which includes an extensible bail and gear and lever mechanism for rotating the bail about the spool for rewinding of the line about the spool during retrieving operations. While, to some extent, either type of reel can be used for some kinds of salt water and fresh water sportfishing, depending upon the skill of the fisherman, the standard fly or bait casting reel is generally more satisfactory for ocean fishing of the larger game fish, whereas spinning reel gear, because of the ease with which good casting can be accomplished even by an inexperienced fisherman, has found wide acceptance for use in freshwater fishing for smaller game, where casting is more important than the strength and control of the retrieving mechanism. It is accordingly the principal object of this invention to provide a combination fishing reel which combines the best features of the fly reel and spinning gear in a single reel, and which can be changed from fly casting reel to spinning reel operation, as desired, while fishing. Thus, while fishing for larger game fish, whether in fresh or salt water, the combination reel can be used in spinning reel position for ease and accuracy in casting, after which the reel can be reset to fly casting reel position for better control over the playing and retrieval of a hooked fish.

It is another object of this invention to provide a combination reel of the character described which, after use as a spinning reel in casting, can readily be converted to fly casting position for line retrieval, thereby dispensing with the bail mechanism forming part of ordinary spinning reels and the mechanical difficulties associated with such bail operation in retrieval.

Yet another object of the invention is to provide a combination reel of the above nature which, while preserving the advantages of spinning reel operation in casting and playing out of a line, eliminates the deficiencies in the spinning reel bail retrieval operation, such as line rotation during wind-on, excessive line looping upon cast off a bail-wound spinning reel, and line wear due to frictional contact with the bail upon retrieval.

Another object of the invention is to provide a combination reel of the character described wherein the spool and line can readily be changed to suit the particular kind of fishing to be undertaken.

Yet another object of the invention is to provide a combination reel of the above nature wherein a wider range of braking control can be effected by combining the braking systems of both the spinning reel and the fly casting reel brake mechanisms.

Other objects, features and advantages of the invention will be apparent from the following description when read with reference to the accompanying drawings. In the drawings, wherein like reference numerals denote corresponding parts throughout the several views.

Figure 1:
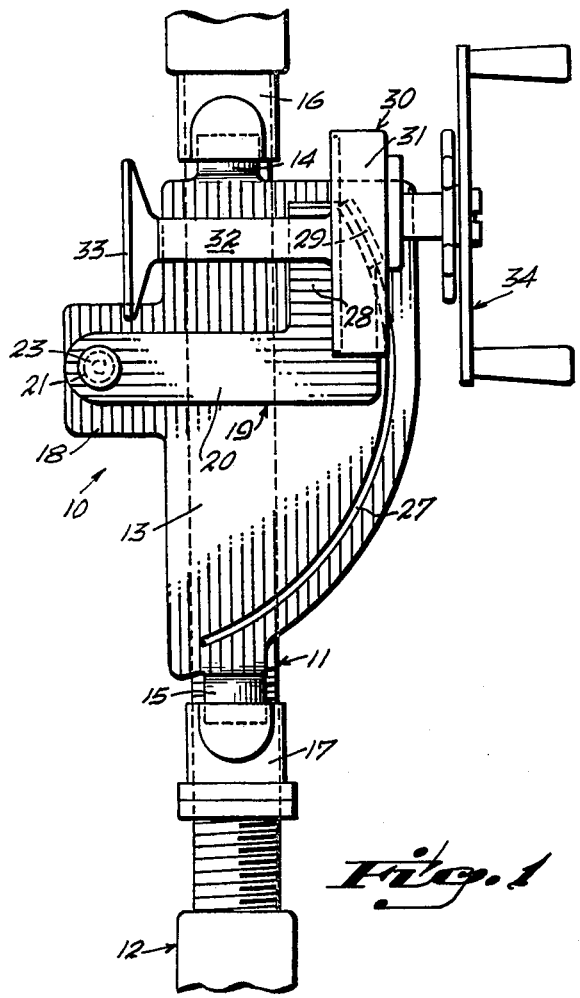
FIG. 1 is a plan view of a combination fishing reel embodying the invention, shown assembled to a fishing rod.
Figure 2:
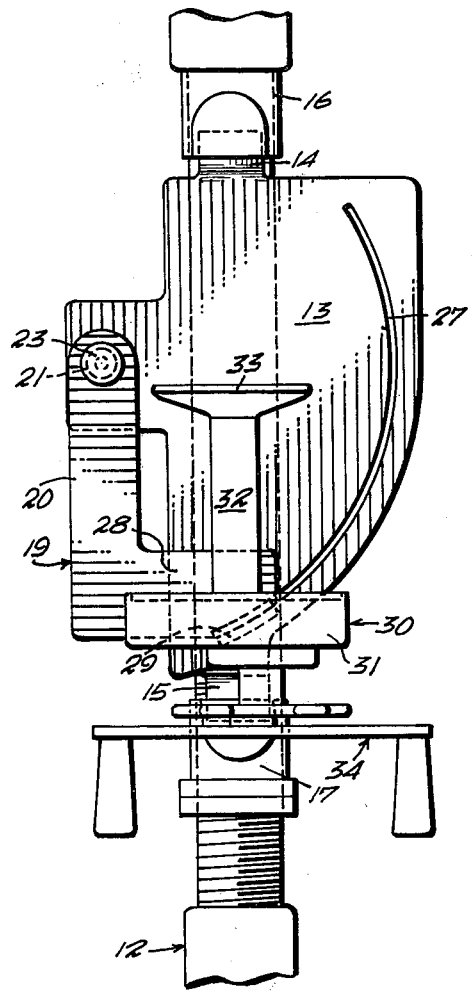
FIG. 2 is a plan view similar to FIG. 1 but showing the reel adjustably positioned for use as a spinning reel.
Figure 3:
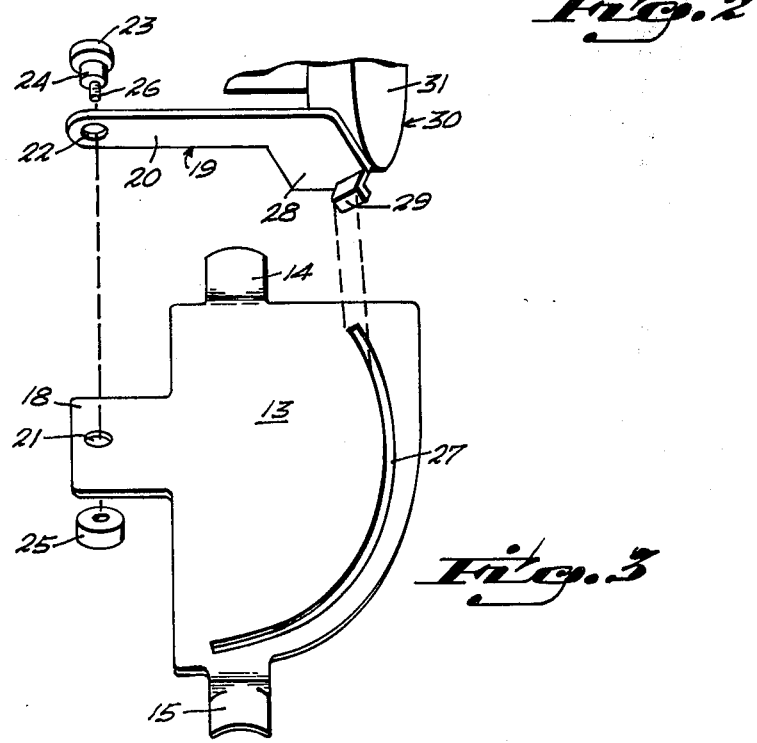
FIG. 3 illustrates, in exploded view with portions broken away, the adjustable base support mechanism for the combination fishing reel.

Referring now in detail to the drawings, reference numeral 10 designates, generally, a combination fly casting and spinning reel embodying the invention, the same being illustrated as assembled to the reel seat 11 of a fishing rod 12, said fishing rod being only partially illustrated. The combination casting and spinning reel 10 comprises a substantially flat base support member 13, which may be either of cast metal or stamped sheet metal, for example. As best illustrated in FIG. 3, the base support member 13 is substantially rectangular in shape, and is integrally formed with a pair of aligned, outwardly-projecting seat clamp lugs 14, 15, adapted to be received within the securement sleeves of a typical fishing rod, as is hereinbelow more particularly described. The seat clamp lugs 14, 15 are downwardly offset (as viewed in FIG. 3), and concavely rounded as seen from the underside to conform with the curvature of a fishing rod reel seat. Thus, as illustrated in FIGS. 1 and 2, the seat clamp lugs will be received under the seucrement sleeves 16, 17 of a typical fishing rod reel seat 11. As illustrated in FIGS. 1 and 2 the upper or outer fishing reel seat securement sleeve 16 is fixed, whereas the lower or inner securement sleeve 17 is screw-threaded for adjustment along the reel seat to clampingly secure the base support member 13 in place. The base support member 13 is also integrally formed with a sidewardly-projecting extension portion 18 providing a pivotal axis for one end of a right-angular pivot arm 19. To this end, the sidewardly-projecting extension portion 18 of the base support member 13, and the outer end of one arm portion 20 of the right-angular pivot arm 19 are each drilled to provide equal diameter through openings 21, 22, respectively. A pivot screw 23 having a cylindrical shank 24 extends through the openings 21 and 22, and is retained in place by a circular nut 25 threaded upon a threaded stud portion 26 extending coaxially outwardly of said shank. Upon assembly, the circular nut 25 will seat securely against the annular shoulder defined by the screw shank 24 and the co-axial threaded stud portion 26, and the length of said screw shank portion will be slightly greater than the combined thickness of sidewardly-projecting extension portion 18 of the base support member 13 and the first arm portion 20 of the right-angular pivot arm 19, to permit pivotal swinging of said pivot arm with respect to said base support member.

Means is provided for limiting the pivotal swinging movement of the right-angular pivot arm 19 to 90 circular degrees with respect to the base support member 13 so that the first pivot arm portion 20 of said pivot arm has a first limit position transverse to the base support member 13, as illustrated in FIG. 1, and a second limit position substantially parallel with the length of said base support member when attached to a fishing reel, as illustrated in FIG. 2. To this end, the base support member 13, substantially opposite the sidewardly-projecting extension portion 18 thereof, is provided with an arcuately-extending through slot 27 having the opening 21 as its center of curvature, and an outer portion of the other arm portion 28 of the right-angular pivot arm 19 is formed with a downwarldy and outwardly-extending hook portion 29 adapted to be hookingly engaged within said slot, as illustrated at both limit positions of said right-angular pivot arm in FIGS. 1 and 2.

A fishing reel assembly, indicated generally at 30, is secured in upstanding relation with respect to an outer end portion of the second pivot arm portion 28 of the right-angular pivot arm 19. As best illustrated in FIGS. 1 and 2, the gear-box housing end 31 of the fishing reel assembly 30 is secured just above the hook portion 29 of the base support member 13, in such a manner that the reel spool or spindle 32 extends in spaced, parallel relation with respect to the first pivot arm portion 20 of said pivot arm. As illustrated in FIGS. 1 and 2, the reel spool 32 is fully journalled at its inner end within the reel gear box 31, and its outer end is formed with an open-ended, small-diameter spool head portion 33, smoothly curved about its inner surface to provide for minimal frictional drag upon use of the device as a spinning reel as hereinbelow more particularly described.

A crank handle assembly 34 extends outwardly of the gearbox housing end 31 of the fishing reel assembly 30 for use of the device as a retrieving reel or trolling reel when in the position illustrated in FIG. 1. Since the gear train and star drag (brake) mechanism of the gear box housing end 31 may be of ordinary, known construction, and forms no part in this invention, a more detailed description is not deemed necessary herein. It will be understood that the spinning reel mechanism will include standard means for spool replacement to provide for the quick change of spooled fishing lines, and that standard spinning reel brake adjustment means will also be incorporated for use in combination with the standard brake mechanism forming part of the fly casting reel.

FIG. 1 illustrates the combination fishing reel adjusted to its position for use as a retrieving (or trolling) reel, the reel spool 32 being transverse to the longitudinal axis of the fishing rod 12. In this position it will be seen that the hook portion 29 of the pivot arm 19 is at the forward limit position in the associated slot 27, which prevents further counter-clockwise movement of the fishing reel assembly 30 about the pivotal axis afforded by the pivot screw 23. Since, as illustrated in FIG. 1, the pivotal axis is substantially outward of the outer end of the reel spool 32, the tensional force of a fishing line being played in or out of the spool will have a tendency to exert a counter-clockwise moment on the pviot arm 19, thereby reetaining said pivot arm in its forward-most limit position as illustrated in FIG. 1 during all usage of device as a retrieving, or trolling reel, or even as a casting reel, if so desired.

When it is desired to change over to use of the device as a spinning reel, it is only necessary to manually move the reel assembly and its associated pivot arm 19 to the rearward-most limit position, as illustrated in FIG. 2, whereat the longitudinal axis of the reel spindle 31 will lie in spaced, parallel relation above the longitudinal axis of the fishing rod. When so positioned, the fishing line will spin off the outer end of the spindle 32 in such a way as to impart very little, if any, moment arm force to the right-angular pivot arm 19, thereby having no tendency to displace the straight, forward position of the reel assembly. Since, as described above, the reel assembly 30 will maintain itself in either of the adjusted positions as illustrated in FIGS. 1 and 2 without any need for locking in place, it can readily be moved from one position to another, as desired, during the various fishing operations such as casting, trolling and reeling in of a fish.

While I have illustrated and described herein only one form in which my invention can conveniently be embodied in practice, it is to be understood that this form is given by way of example only and not in a limiting sense. The invention, in brief, comprises all the embodiments and modifications coming within the scope and spirit of the following claims.

What I claim as new and desire to secure by Letters Patent is:

1. A combination fly and spinning reel for use with a fishing rod equipped with a reel seat comprising, in combination, a base support member, means for attachment of said base support member to a fishing rod reel seat, a substantially flat pivot arm, means for swingably attaching one end of said pivot arm with respect to said base support member for selective movement between limit positions spaced 90 circular ° apart, a fishing reel assembly comprising a gear box and an open-ended reel spool, means rotatively journalling one end of said reel spool with respect to said gear box, handle means for rotatively controlling said reel spool through said gear box, means mounting said fishing reel assembly comprising said gear box and said reel spool with respect to the other end of said pivot arm so that the rotational axis of said reel spool, when said pivot arm is in one of said limit positions, is disposed in transverse position with respect to a fishing rod when said base support member is attached to the fishing rod reel seat, and in axial alignment directly above and with respect to said fishing rod when moved to the other of said limit positions, said base support member and said pivot arm being substantially flat and relatively movable while in substantially face-to-face relation, said means for swingably attaching said pivot arm comprising a pivot member extending through aligned openings in said one end of said pivot arm and in said base support member, and an arcuate slot in said base support member the center of curvature of which is coincident with the pivotal axis of said pivot member, said pivot arm having hook means extending through said arcuate slot and serving as abutment means at the ends of said slot at said limit positions.

* * * * *